GATE AND MEMORY CIRCUITS UTILIZING MAGNETIC CORES

Filed Nov. 20, 1952

INVENTOR
JOHN O. PAIVINEN
BY
Donald W. Phillion
ATTORNEY

United States Patent Office 2,729,807

Patented Jan. 3, 1956

2,729,807

GATE AND MEMORY CIRCUITS UTILIZING MAGNETIC CORES

John O. Paivinen, Aldan, Pa., assignor to Burroughs Corporation, Detroit, Mich., a corporation of Michigan Application November 20, 1952, Serial No. 321,707

13 Claims. (Cl. 340—174)

This invention relates generally to gate and memory circuits and more particularly to gate and memory circuits utilizing magnetic cores.

Gate circuits and memory circuits in the prior art are comprised largely of electronic circuits utilizing gas tubes, vacuum tubes, and cathode ray tubes or relay circuits. Electronic circuits require critical voltages and currents. The problem of burned-out filaments and handling of delicate electronic equipment is almost always present in connection with electronic equipment. Relay circuits generally are relatively slow operating and often present maintenance considerations in that contacts must remain reasonably free of dirt and corrosion.

It would be desirable to have a gate and memory circuit that had the characteristics of rapid operation and required a minimum of maintenance. Such a circuit can be obtained by the use of magnetic materials.

One of the objects of the present invention is a gate and memory circuit comprised of magnetic cores.

Another object of this invention is a gate and memory circuit having rapid operation with a minimum of maintenance.

A third object is a gate and memory circuit having no moving parts.

A further object of the invention is a gate and memory circuit having no filaments.

Another object of the invention is to improve the reliability of gate and memory circuits.

A further object of the invention is a circuit which can operate both as a gate circuit and a memory circuit.

A seventh object is to improve gate and memory circuits generally.

In accordance with one embodiment of the invention a first plurality of magnetic cores is provided each having an individual sensing winding thereon, said sensing windings being connected in parallel between a first common point and a second common point. Energizing means are provided to energize said sensing windings. Each of said first plurality of magnetic cores further has associated therewith an individual input means which when energized is adapted to selectively cause the associated magnetic core to assume a condition of remanence of a first polarity and a plurality of third means each individual to one of said magnetic cores and adapted when energized to cause the associated magnetic core to assume a condition of remanence of a second polarity. A second magnetic core means has energizing means responsive to the condition of remanence of said first plurality of magnetic cores when said sensing windings are energized, output means responsive to a change of magnetic flux in said second magnetic core, and a third means when energized adapted to selectively cause said magnetic core to assume a remanence of a given polarity.

In accordance with one feature of the invention the said sensing windings are connected in parallel so that the circuit will operate as a gate circuit in that if any one of said first plurality of magnetic cores is in a condition of remanence such that its sensing winding presents a low impedance to a sensing current, an insufficient current will flow through the said energizing means of said second magnetic core to reverse the magnetic flux saturation polarity therein. If all of said first plurality of magnetic cores are caused to change magnetic flux polarities in such a manner as to present a high impedance to said sensing current there will be insufficient current through said energizing means to cause said second magnetic core to reverse magnetic flux remanence polarity.

In accordance with another feature of the invention the circuit constitutes a memory device in that the magnetic flux condition of said first plurality of magnetic cores need not occur at any particular time before a sensing current is caused to be impressed on the associated sensing windings.

These and other objects and features of the invention will become more readily understood from the following detailed description of the invention when read in conjunction with the drawings in which.

Figure 1:
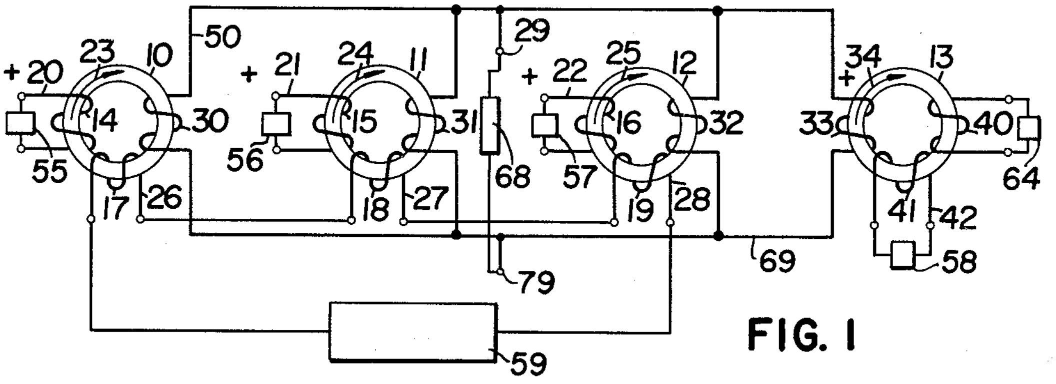
Fig. 1 is a schematic sketch of one embodiment of the invention.
Figure 3:
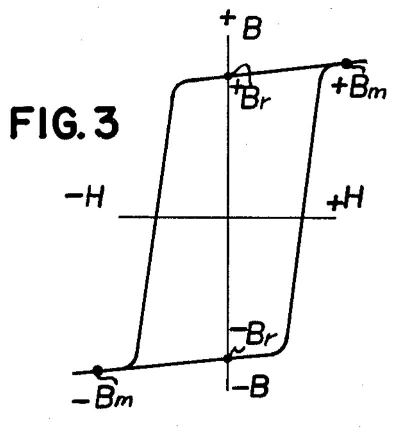
Fig. 3 is a typical magnetic flux characteristic curve of the magnetic cores used in Fig. 1 and Fig. 2.

Referring now to Fig. 1 four bistable impedances, such as the magnetic cores 10, 11, 12, and 13, each one consisting of a closed loop of magnetic material having a characteristic curve similar to that of Fig. 3. Such a material can be one of the ferrites. Other magnetic materials can be used, however. Each of the magnetic loops in the structure shown in Fig. 1 has a cross-sectional area of approximately $2.5 \times 10^{-4}$ square inches and a mean length of 0.3 inch. Input windings 14, 15, and 16, each having 40 turns, are associated respectively with magnetic cores 10, 11, and 12. Positive pulses from pulse sources 55, 56, and 57 applied to input leads 20, 21, and 22 respectively will cause the associated magnetic core to become positively saturated with magnetic flux as arbitrarily indicated by the direction of the arrows 23, 24, and 25. Positive pulses from pulse source 59 which is connected across the series combination of windings 17, 18 and 19 can be caused to flow into terminals 26, 27, and 28 to cause the magnetic cores 10, 11, and 12 to become negatively saturated with magnetic flux in opposition to the direction of the arrows 23, 24, and 25. A positive sensing current pulse from pulse source 68 impressed across terminals 79 and 29 is of such a polarity that if it flowed through sensing windings 30, 31, and 32 each composed of 150 turns it would tend to cause the magnetic cores 10, 11, and 12 to become negatively saturated with magnetic flux. Winding 33, composed of 40 turns is wound upon core 13 in such a manner as to tend to cause magnetic core 13 to become positively saturated with magnetic flux in the direction of the arrow 34 when a positive sensing current pulse is applied to terminal 29. It is to be noted that the portion of the sensing pulse flowing into terminal 29 through winding 33 will not always be sufficiently large to cause said magnetic core 13 to switch from a negative magnetic flux condition to a positive magnetic flux condition as will be seen more clearly from the detailed operational description contained hereinafter. Winding 41, composed of 150 turns performs the function of causing the magnetic core to become negatively saturated with magnetic flux when a positive current pulse is impressed upon terminal 42. Pulse source 58 is provided to energize winding 41. Winding 40 comprises the output winding and is adapted to detect a change of magnetic flux in the magnetic core 13. Load means 64 is connected across winding 40. Clearing windings 17, 18, and 19 are composed of about 150 turns each.

Figure 2:
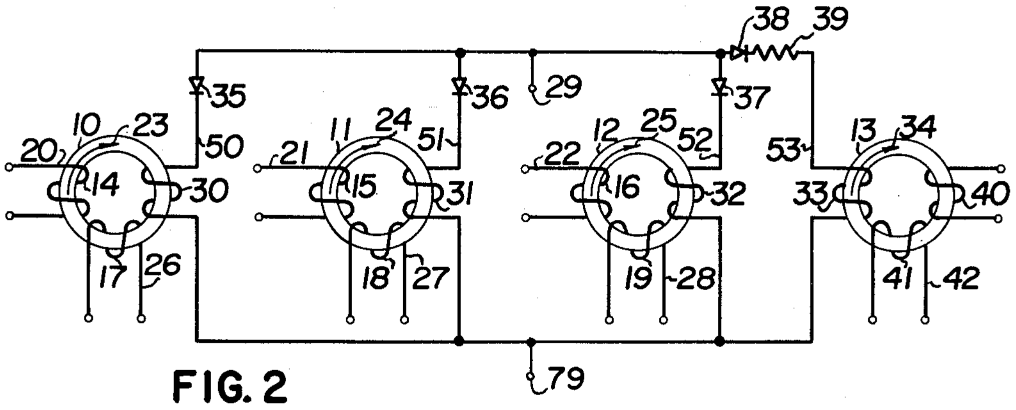
Fig. 2 is a schematic sketch of another embodiment of the invention.

Referring now to Fig. 2, there is shown an embodiment of the invention similar to the structure shown in Fig. 1. The corresponding elements including the magnetic cores, the windings thereon, the windings' terminals, and terminal 29 have the same reference characters as in Fig. 1. It is to be understood that the circuit of Fig. 2 has pulse sources similar to those of Fig. 1 although they are not shown. Asymmetrical devices 35, 36, 37, and 38 prevent undesirable current flows. For example, the application of a positive input current impulse upon terminal 20 would, in the absence of asymmetrical devices 35, 36, and 37, result in a current flow in windings 31 and 32 (from the induced voltage in winding 30) that would have a similar effect as a positive input pulse impressed on terminals 21 and 22 of input windings 15 and 16 of magnetic cores 11 and 12 respectively. There would also be produced a current flow in input winding 33 of magnetic core 13. Asymmetrical devices 35, 36, 37, and 38 prevent such unwanted current flows.

Due to the minimum resistance presented by the forward impedance of asymmetrical devices 35, 36, 37, and 38 to a sensing current impulse, the signal to noise ratio is improved by the addition of a 56 ohm resistor 39. This will become more apparent in the operational description thereof.

In Fig. 3 there is shown a typical saturation curve of the magnetic cores used in Fig. 1 and Fig. 2. Positive saturation is indicated by the reference character +B*m*. Positive remanence is indicated by the reference character +B*r*. Negative saturation is indicated by the notation —B*m* and negative remanence is indicated by the reference character —B*r*. The abscissa of the curve is in oersteds and the ordinate of the curve is in gauss density.

The operation of the circuits shown in Fig. 1 and Fig. 2 will now be described in detail. Inasmuch as the operation of the circuit in Fig. 1 is substantially the same as the operation of the circuit shown in Fig. 2 with the exception that asymmetrical devices 35, 36, 37, and 38, and resistance 39 are included in the circuit of Fig. 2 only the operation of Fig. 2 will be explained in detail with any differences of operation in the two circuits specifically noted.

As explained hereinbefore, when any of the magnetic cores 10, 11, or 12 is in a condition of negative remanence (opposite the direction of the arrows 23, 24, and 25) the respective sensing windings 30, 31, and 32 will individually present a low impedance to a positive sensing pulse applied to input terminal 29 since such a sensing pulse will cause negative saturation of the magnetic cores 10, 11, and 12. If any of the magnetic cores is in a condition of positive remanence (in the direction of the arrows 23, 24, and 25) then the associated sensing winding of sensing windings 30, 31, and 32 will present a high impedance to a positive sensing pulse applied to terminal 29.

Thus it can be seen that the sensing current will be shunted through the sensing windings of those cores of cores 10, 11, and 12 which are in a condition of negative remanence and the current through the winding 33 of core 13 will be negligible. If all the cores 10, 11, and 12 are in a condition of positive remanence there will be a high impedance presented to the sensing current thereby and substantially all of the sensing current will flow through the winding 33 of core 13.

An examination of the operation of magnetic core 10 will illustrate the function of the individual core. If a magnetic core 10 is initially in a condition of negative remanence (—B*r*) and then a positive current pulse is applied on terminal 20 of input winding 14, the magnetic core 10 will switch to a condition of positive saturation (+B*m*) as shown in Fig. 3 for as long as the current pulse continues. When the current pulse is removed the magnetic core 10 will return to a condition of positive remanence (+B*r*) as shown in Fig. 3. If then a sensing pulse from pulse source 68 is caused to be applied to terminal 50 of sensing winding 30, the said sensing winding 30 will present a high impedance thereto since the polarity of the sensing pulse is such as to tend to cause the core 10 to assume a condition of negative remanence. Consequently, the sensing current will flow through the sensing windings 31 and 32 of cores 11 and 12 respectively which are assumed to be in a condition of negative remanence, or, if the cores 10 and 11 are also in a condition of positive remanence the sensing current will flow through the winding 33 of core 13 to cause a reversal of remanence polarity of core 13. If a clearing current pulse from clearing pulse source 59 is then applied to terminal 26 of winding 17 the magnetic core 10 will switch from a condition of positive remanence (+B*r*) to a condition of negative saturation (—B*m*) for the duration of the current pulse. It is to be noted that the sensing current may have partially switched the core 10. When the clearing current pulse is removed the material will return to a condition of negative remanence (—B*r*) as shown in Fig. 3.

Had core 10 been in a condition of negative remanence (—B*r*) when a sensing pulse was applied, the sensing winding 30 of core 10 would have presented a low impedance thereto and thus provided a shunting path for the sensing current.

Thus the circuit in this preferred embodiment of the invention operates as an "and" circuit since an output current is obtained in winding 33 of core 13 to switch the remanence polarity of core 13 only if all of the magnetic cores 10, 11, and 12 are in condition of positive remanence at the time the sensing pulse is generated from source 68. Under these circumstances the sensing current can be traced from source 68, terminal lead 29, winding 33 of core 13, terminal lead 69, and back to source 68. The current winding 33 will switch the remanence polarity of core 13 to induce a voltage in winding 40. The voltage induced in winding 40 will produce a current flow through load 64.

If any one of the cores 10, 11, or 12 is in a condition of negative remanence the sensing current will flow through the associated winding and shunt the winding 33 of core 13. Assume, for example, that cores 11 and 12 are in a condition of positive remanence and that core 10 is in a condition of negative remanence. The sensing pulse may then be traced from source 68, terminal 29, winding 30 of core 10, terminal 69, and back to source 68.

Because there can be an indefinite length of time between the input pulses and the sensing pulses the circuit can be utilized as a memory circuit. In the preferred embodiment shown in Fig. 2 sensing windings 30, 31, and 32 are connected in parallel with respect to sensing input terminal 29. Thus, if any of the magnetic cores 10, 11, or 12 is in a condition of negative remanence, the associated sensing windings will present a low impedance to a sensing pulse so that most of the sensing current will flow through the said associated sensing windings and no appreciable current will flow through the sensing windings associated with any magnetic core in a condition of positive remanence (+B*r*). Further, the impedance presented by winding 33 of magnetic core 13 of Fig. 2 plus the impedance of resistance 39 is great enough compared to the impedance of a sensing winding whose associated magnetic core is in a condition of negative remanence that most of the sensing current will flow through the said sensing winding and insufficient current will flow through winding 33 of core 13 to cause it to switch from remanence of one polarity to flux saturation of the opposite polarity. Thus, it can be seen that the circuit of Fig. 2 can be operated as an "and" gate circuit in that all three of the magnetic cores 10, 11, and 12 must be in a condition of positive remanence (+B*r*) in order to have sufficient current flow through winding 33 of core 13 to cause magnetic core 13 to switch from a condition of remanence of a first polarity to a condition of magnetic flux saturation of the other polarity to produce an induced voltage on output winding 40.

After input pulses have been applied to the desired windings of input windings 20, 21, and 22 and after the magnetic flux condition of the magnetic cores 10, 11, and 12 has been sensed by a sensing pulse applied to terminal 29 the circuit may be cleared (returning to a condition of negative remanence) by application of positive pulses from pulse source 59 on terminals 26, 27, and 28 of clearing windings 17, 18, and 19 respectively. Magnetic core 13, assuming its magnetic flux polarity has been switched by the sensing pulse, may be cleared by application of a positive pulse from pulse source 58 applied to terminal 42 of winding 41.

It can be seen that since the magnetic flux condition of the magnetic cores 10, 11, and 12 will remain for an indefinite time after the termination of the input pulses the circuit can be utilized as a memory wherein if all the cores 10, 11, and 12 are in a condition of positive remanence a sensing pulse will cause an output voltage to be induced in winding 40 of core 13 and whereas if any one of said cores 10, 11, or 12 is in a condition of negative remanence no output voltage will be induced in winding 40. Also the circuit constants can be designed so that any two of the magnetic cores 10, 11, or 12 must be in a condition of negative remanence to avoid having an output voltage induced in winding 40.

A further adaption of the circuits of Fig. 1 and Fig. 2 can be obtained by having the input pulses applied to the input windings 14, 15, and 16, to cause the cores 10, 11, and 12 to assume a condition of negative remanence (opposite the direction of arrows 23, 24, and 25). The clearing pulse source 59 is adapted to cause the cores 10, 11, and 12 to assume a condition of positive remanence and the sensing pulse source 68 is adapted to tend to cause the cores 10, 11, and 12 to assume a condition of negative remanence. Under these conditions the sensing windings 30, 31, and 32 will present a high impedance to the sensing current when the associated magnetic cores 10, 11, and 12 are in a condition of positive remanence which is representative of the lack of the application of prior input pulse on each of the input windings 14, 15, and 16. The sensing current will then flow in a path extending from source 68, terminal lead 29, winding 33 of core 13, terminal lead 69, winding 33 of core 13, terminal lead 69, and back to source 68. Thus a voltage will be induced in the output winding 40 of core 13.

When input pulses are applied to the input windings 14, 15, and 16, the associated cores 10, 11, and 12 are caused to assume a condition of negative remanence. Consequently, the associated sensing windings will present a low impedance to the sensing current so that the input winding 33 of core 13 will be effectively shunted by the sensing windings 30, 31, and 32.

It is to be noted that the circuit constants of the circuit can be arranged so that if one or two of the cores 10, 11, or 12 are in a condition of positive remanence there will still be a sufficient impedance presented to the sensing current to cause the core 13 to switch magnetic flux polarity.

More than three magnetic cores such as cores 10, 11, or 12 can be used, or, less than three can be used. This is a matter of engineering design. Other changes may also be made in values of circuit constants or circuit arrangement without departing from the spirit or scope of the invention.

What is claimed is:

1. A plurality of first magnetic cores, each having a positive and a negative magnetic flux condition, a plurality of sensing windings individual to each of said plurality of first magnetic cores, each of said plurality of sensing windings having a first terminal and a second terminal, a plurality of input windings individual to each of said plurality of first magnetic cores, a first plurality of pulse input sources each individual to one of said input windings, a third plurality of windings individually associated with each of said plurality of first magnetic cores, a second pulse input source adapted to energize said third plurality of windings, a second magnetic core, a fourth input winding associated with said second magnetic core, an output winding associated with said second magnetic core, a third winding associated with said second magnetic core, a first common point, a second common point, the said first terminals of said plurality of sensing windings being connected to a first common point and the said second terminals of said plurality of sensing windings being connected to a second common point, and a third pulse source being connected across said first common point and said second common point, said fourth input winding being adapted to be energized by said third pulse source in accordance with the remanence condition of said first plurality of magnetic cores.

2. A circuit in accordance with claim 1 comprising a plurality of asymmetrical devices, one each of said asymmetrical devices being in series with each of said plurality of sensing windings.

3. A circuit in accordance with claim 1 comprising a plurality of asymmetrical devices, one each of said asymmetrical devices being connected in series with each of said plurality of sensing windings, and a second asymmetrical device and a resistance connected in series with said fourth input winding.

4. A circuit in accordance with claim 1 comprising a plurality of asymmetrical devices, one each of said asymmetrical devices being in series with each of said plurality of sensing windings, a second asymmetrical device, a resistance, said second asymmetrical device and said resistance being connected in series with said fourth input winding, the series combination of said second asymmetrical device, said resistance, and said fourth input winding being connected between said first common point and said second common point.

5. A plurality of first magnetic cores, a plurality of first means individual to each of said first magnetic cores and adapted when energized to selectively cause said plurality of first magnetic cores to have a condition of remanence of a first polarity, each of said plurality of first means comprising a first winding and an individual input pulse source, a plurality of second means individual to each of said first magnetic cores and adapted when energized to cause said plurality of first magnetic cores to have a condition of remanence of a second polarity, energizing means for said plurality of second means, a plurality of second winding means individual to each of said first magnetic cores and adapted when energized to sense the condition of remanence of said plurality of first magnetic cores, a second input pulse means, said plurality of second winding means being connected in parallel arrangement with each other with respect to the said second input pulse means, said second input pulse means adapted to energize said plurality of second winding means, a second magnetic core whose magnetic flux condition is responsive to the remanence condition of said plurality of first magnetic cores when said plurality of second winding means is energized, and output means responsive to a change in magnetic flux in said second magnetic core.

6. A circuit in accordance with claim 5 comprising a plurality of asymmetrical devices, one each of said asymmetrical devices being connected in series with each of said plurality of second winding means.

7. A gate circuit comprising a plurality of first magnetic cores, a plurality of input windings each individual to one of said plurality of first magnetic cores and adapted when energized to selectively cause said magnetic cores to have a remanence condition of a first polarity, a first plurality of input pulse sources individually associated with one each of said input windings and adapted to selectively energize each of said input windings, a plurality of clearing windings each individual to one of said plurality of first magnetic cores and adapted when energized to cause said magnetic cores to have a remanence condition of a second polarity, a second pulse source adapted to energize said plurality of clearing windings, a plurality of sensing windings each individual to one of said plurality of first magnetic cores, a third current source, said plurality of sensing windings being connected in parallel with respect to said third current source, a second magnetic core, a first winding wound on said second magnetic core and connected to said third current source in parallel with said plurality of sensing windings, a second clearing winding wound on said second magnetic core, an output winding wound on said second magnetic core responsive to a change in polarity of magnetic flux in said second magnetic core, the impedances presented to a current from said third current source by said sensing windings being either large or small in accordance with the remanence polarity of the associated magnetic cores of said plurality of first magnetic cores, and the current flow through said first winding being either large enough to cause reversal of remanence polarity in said second magnetic core or small enough to leave unchanged the remanence polarity of said second magnetic core in accordance with the overall impedance of said parallel combination of said sensing windings.

8. A gate circuit in accordance with claim 7 comprising a plurality of asymmetrical devices, one each of said plurality of asymmetrical devices being connected in series with each of said plurality of sensing windings in such a manner as to present its forward impedance to a current from said current source.

9. A gate circuit in accordance with claim 7 comprising a plurality of first asymmetrical devices, one each of said plurality of asymmetrical devices being connected in series with each of said plurality of sensing windings in such a manner as to present its forward impedance to a current from said third current source, a second asymmetrical device, and a resistance, said second asymmetrical device and said resistance being connected in series with said first winding in such a manner that said asymmetrical device presents its forward impedance to a current from said third current source.

10. A memory circuit comprising a plurality of first magnetic cores, a plurality of first input windings each individual to one of said plurality of first magnetic cores and adapted when energized to selectively cause said magnetic cores to have a remanence condition of a first polarity, a first plurality of input pulse sources adapted to individually and selectively energize said plurality of first input windings, a plurality of clearing windings each individual to one of said plurality of first magnetic cores and adapted when energized to selectively cause said magnetic cores to have a remanence condition of a second polarity, a plurality of energizing means adapted to individually energize said plurality of clearing windings, a plurality of sensing windings each individual to one of said plurality of first magnetic cores, a current source, said plurality of sensing windings being connected in parallel with respect to said current source, a second magnetic core, a first winding wound on said second magnetic core and connected to said current source in parallel with said plurality of sensing windings, a second clearing winding wound on said second magnetic core, an output winding wound on said second magnetic core responsive to a change in polarity of the magnetic flux in said second magnetic core, the impedances presented to a current from said current source by said sensing windings being either large or small in accordance with the remanence polarity of the associated magnetic cores of said plurality of first magnetic cores and the current flow through said first winding being either large enough to cause reversal of remanence polarity in said second magnetic core or small enough to leave unchanged the remanence polarity of said second magnetic core in accordance with the parallel combination impedance of said parallel combination of said sensing windings.

11. A memory circuit in accordance with claim 10 comprising a plurality of asymmetrical devices, one each of said plurality of asymmetrical devices being connected in series with each of said plurality of sensing windings in such a manner as to present its forward impedance to a current from said current source.

12. A memory circuit in accordance with claim 10 comprising a plurality of first asymmetrical devices, one each of said plurality of asymmetrical devices being connected in series with each of said plurality of sensing windings in such a manner as to present its forward impedance to a current from said current source, a second asymmetrical device, and a resistance, said second asymmetrical device and said resistance being connected in series with said first winding in such a manner that said asymmetrical device presents its forward impedance to a current from said current source.

13. A memory circuit comprising a plurality of first bistable elements having substantially rectangular hysteresis characteristics, a plurality of first input circuits each individual to one of said plurality of bistable elements, and adapted for energization to selectively cause said bistable elements to have a remanence condition of a first polarity, a first plurality of input pulse sources adapted to individually and selectively energize said plurality of first input circuits, a plurality of clearing circuits each individual to one of said plurality of first bistable elements and adapted when energized to selectively cause said bistable elements to have a remanence condition of a second polarity, a plurality of energizing means adapted to individually energize said plurality of clearing circuits, a plurality of sensing circuits each individual to one of said plurality of first bistable elements, a current source, said plurality of sensing circuits being connected in parallel with respect to said current source, a second bistable element, a first circuit for said second bistable element and connected to said current source in parallel with said plurality of sensing circuits, a second clearing circuit coupled to said bistable element, an output circuit coupled to said second bistable element and responsive to a change in polarity of the storage state in said second bistable element, the impedances presented to a current from said current source by said sensing circuits being either large or small in accordance with the remanence polarity of the associated binary elements of said plurality of first bistable elements, and the current flow through said first input circuit being either large enough to cause reversal of remanence polarity in said second bistable element or small enough to leave unchanged the remanence polarity of said second bistable element in accordance with the parallel combination impedance of said parallel combination of said sensing circuits.

References Cited in the file of this patent

An Electronic Digital Computer by A. D. Booth, in Electronic Engineering (British), December 1950; pages 492–498.

Progress Report (2) on the EDVAC; vol. 1. II, published June 30, 1946. Moore School of Electrical Engineering, Univ. of Penn., Philadelphia, Penn., especially paragraph 4.2.12 et al., and Figures 17*a*, *b* and *c*.

Static Magnetic Storage and Delay Line by An Wang & Way Dong Woo; Journal of Applied Physics, January 1950 (paper received July 27, 1949), pgs. 49–54.